Sept. 19, 1961     H. G. BRAENDEL     3,000,678
PISTON RING
Filed Nov. 24, 1959

*INVENTOR.*
HELMUTH G. BRAENDEL
BY
Arthur H. Seidel
ATTORNEY

3,000,678
PISTON RING

Helmuth Gunther, Braendel, Malvern, Pa., assignor to Wilkening Manufacturing Co., Philadelphia, Pa., a corporation of Delaware
Filed Nov. 24, 1959, Ser. No. 855,099
3 Claims. (Cl. 309—45)

The present invention relates to a piston ring, and more particularly to a piston ring for use in internal combustion engines.

A type of piston ring used in internal combustion engines includes a compression ring, an oil control ring, and a spacer ring. The spacer ring not only holds the compression ring spaced from the oil control ring, but also must urge the compression ring and oil control ring radially outwardly against the cylinder. A problem in such piston rings is not only the wear of the edges of the compression and oil control rings which slidingly engage the cylinder, but also wear of the mating surfaces of the spacer and the compression and oil control rings caused by movement of the compression and oil control rings.

It is an object of the present invention to provide a novel piston ring for internal combustion engines.

It is another object of the present invention to provide a piston ring construction which reduces the surface wear between the space and the compression and oil control rings of the piston ring.

Other objects will appear hereinafter.

For the purpose of illustrating the invention there is shown in the drawings a form which is presently preferred; it being understood, however, that this invention is not limited to the precise arrangements and instrumentalities shown.

Figure 1:
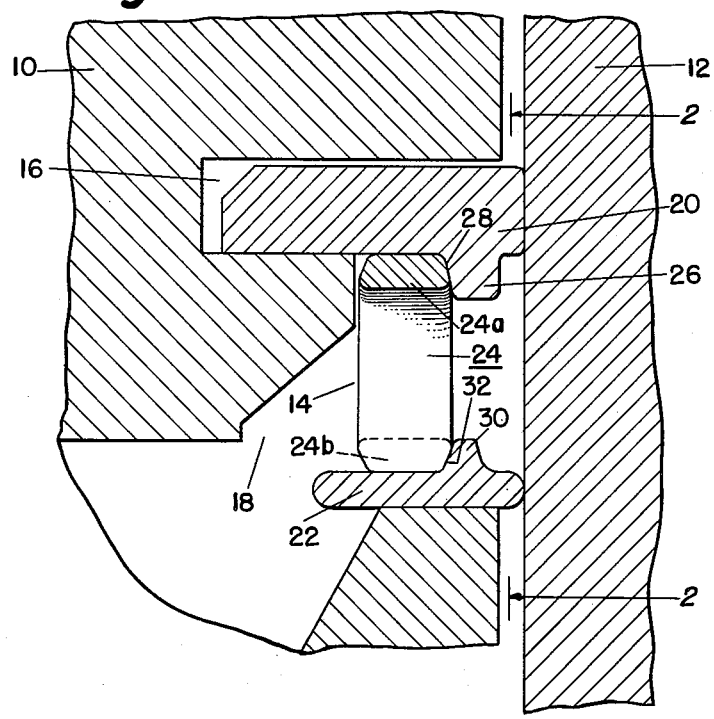
FIGURE 1 is a sectional view through the piston ring of the present invention showing the piston ring associated with a piston and cylinder.
Figure 2:
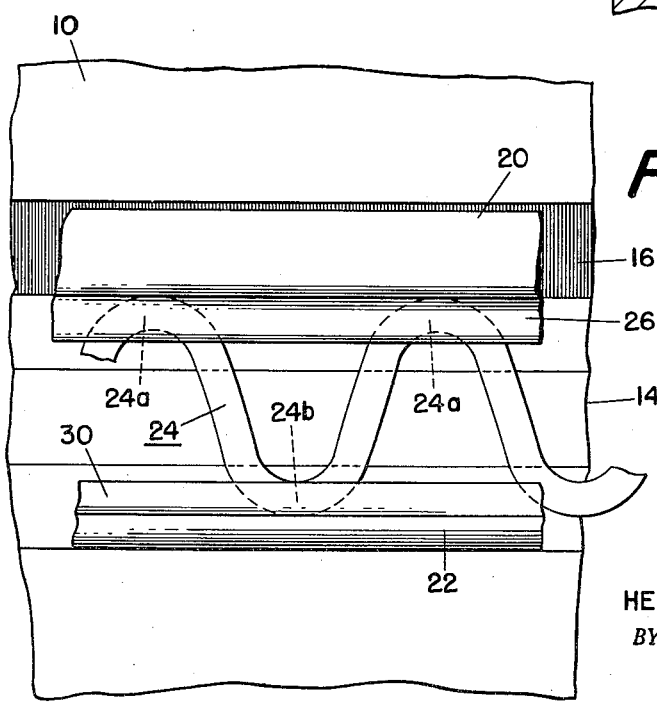
FIGURE 2 is an elevational view looking in the direction of arrows 2—2 of FIGURE 1.

Referring to FIGURE 1, there is shown a piston 10 slidable within a cylinder 12. The piston 10 is provided with an annular ring groove 14 in its outer surface. An annular recess 16 is provided in the inner surface of the ring groove 14 adjacent the top of the ring groove 14. An oil drainage passageway 18 extends from the inner surface of the ring groove 14 to the interior of the piston 10, which is hollow.

The piston ring of the present invention includes an annular compression ring 20, an annular rail 22, and an annular spacer 24.

The compression ring 20, which may be of cast iron, is substantially rectangular, and has an outer surface which slidably engages the inner surface of the cylinder 12. The compression ring 20 is split radially to permit it to expand against the cylinder 12. An annular projection 26 extends axially downwardly from the bottom surface of the compression ring 20 adjacent to but spaced radially from the outer periphery of the compression ring 20. The inner surface 28 of the projection 26 tapers slightly radially outwardly from the bottom surface of the compression ring 20. The compression ring 20 is positioned in the top portion of the ring groove 14, and extends into the annular recess 16. The bottom surface of the compression ring 20 sealingly engages the bottom wall of the annular recess 16.

The rail ring 22, which may be made of steel, is substantially rectangular in transverse cross-section, and has an outer edge which slidably engages the cylinder 12. The rail ring 22 is radially split so that it can expand against the cylinder 12. An annular projection 30 extends axially upwardly from the top surface of the rail ring 22 adjacent to but spaced radially from the outer edge of the rail ring 22. The inner surface 32 of the projection 30 is tapered radially outwardly from the top surface of the rail ring 22. The rail ring is positioned within the ring groove 14 with the bottom surface of the rail ring 22 sealingly engaging the bottom wall of the ring groove 14.

The annular spacer or spacer ring 24, which is of a spring metal, is sinuously corrugated and comprises throughout its length the opposed peaks 24a and 24b. The peaks 24a and 24b of the spacer ring 24 are each of a transverse cross-sectional shape of substantially a trapezoid. The spacer ring 24 is positioned between the compression ring 20 and the rail ring 22. The top peaks 24a of the spacer ring 24 seat against the bottom surface of the compression ring 20 and the tapered inner surface 28 of the projection 26 of the compression ring 20. The bottom peaks 24b of the spacer ring 24 seat against the top surface of the rail ring 22 and the tapered inner surface 32 of the projection 30 of the rail ring 22. The surfaces of the top peaks 24a of the spacer ring 24 which engage the bottom surface of the compression ring 20 and the tapered surface 28 of the projection 26 are contoured to matingly engage the corresponding surfaces of the compression ring 20. The surfaces of the bottom peaks 24b of the spacer ring 24 are likewise contoured to matingly engage the top surface of the rail ring 22 and the tapered surface 32 of the projection 30. It has been found that by making the engaging surfaces of the spacer 24 and the compression ring 20 and rail ring 22 matingly contoured, there is provided less surface wear between the engaging surfaces. Also, the piston ring of the present invention has improved stability, improved side loading for better sealing, and the compression ring 20 and rail ring 22 hug the sides of the ring groove 14 better under high vacuum conditions.

The present invention may be embodied in other specific forms without departing from the spirit or essential attributes thereof and, accordingly, reference should be made to the appended claims, rather than to the foregoing specification as indicating the scope of the invention.

I claim:
1. A piston ring comprising an annular compression ring, said compression ring having an annular projection extending axially downwardly from the bottom surface thereof adjacent to the outer periphery thereof, an annular rail ring spaced from said compression ring, said rail ring having an annular projection extending axially upwardly from the top surface thereof adjacent to the outer periphery thereof, and an annular spacer ring between said compression ring and said rail ring biasing said rings apart, said spacer ring being uniformly corrugated with the opposed peaks thereof being longitudinally spaced apart, the top peaks of said spacer ring being contoured so that the top peaks matingly engage the bottom surface of the compression ring and the inner surface of the compression ring projection, and the bottom peaks of said spacer ring being contoured so that said bottom peaks matingly engage the top surface of said rail ring and the inner surface of the rail ring projection.

2. A piston ring in accordance with claim 1 in which the inner surface of the compression ring projection is tapered radially outwardly from the bottom surface of the compression ring, and the inner surface of the rail ring projection is tapered radially outwardly from the top surface of the rail ring.

3. A piston ring comprising an annular compression ring, said compression ring being substantially rectangular in transverse cross-section and having a cylinder engaging outer edge, an annular projection extending downwardly from the bottom surface of said compression ring adjacent to the outer periphery of the compression ring, the inner surface of said projection being tapered radially outwardly from the bottom surface of the compression ring, an annular rail ring being substantially rectangular in transverse cross-section and having a cylinder engaging outer edge, an annular projection extending upwardly from the top surface of the rail ring adjacent to the outer periphery of said rail ring, the inner surface of the rail ring projection being tapered radially outwardly from the top surface of said rail ring, and an annular spacer ring between said compression ring and said rail ring, said spacer ring being uniformly corrugated with the opposed peaks thereof being axially spaced apart, the top peaks of said spacer ring being contoured so that the top peaks matingly engage the bottom surface of the compression ring and the tapered inner surface of the compression ring projection, and the bottom peaks of said spacer ring being contoured so that said bottom peaks matingly engage the top surface of the rail ring and the tapered inner surface of the rail ring projection.

References Cited in the file of this patent

UNITED STATES PATENTS

| | | |
|---|---|---|
| 2,424,881 | Fall | July 29, 1947 |
| 2,777,740 | Hsia-Si-Pien | Jan. 15, 1957 |
| 2,886,385 | Marien | May 12, 1959 |

FOREIGN PATENTS

| | | |
|---|---|---|
| 236,822 | Switzerland | July 2, 1945 |

UNITED STATES PATENT OFFICE
CERTIFICATE OF CORRECTION

Patent No. 3,000,678                                  September 19, 1961

Helmuth Gunther Braendel

It is hereby certified that error appears in the above numbered patent requiring correction and that the said Letters Patent should read as corrected below.

In the grant, lines 1 and 2, for "Helmuth Gunther, of Braendel, Malvern, Pennsylvania," read -- Helmuth Gunther Braendel, of Melvern, Pennsylvania, --; in the heading to the printed specification, line 3, for "Helmuth Gunther, Braendel, Malvern, Pa.," read -- Helmuth Gunther Braendel, Malvern, Pa., --.

Signed and sealed this 3rd day of April 1962.

(SEAL)
Attest:

ERNEST W. SWIDER
Attesting Officer

DAVID L. LADD
Commissioner of Paten